March 27, 1945.  J. B. BROWN  2,372,311
CONTROL MECHANISM
Filed April 17, 1939  12 Sheets-Sheet 1

INVENTOR.
JESSE B. BROWN
BY
Jerome R. Cox
ATTORNEY.

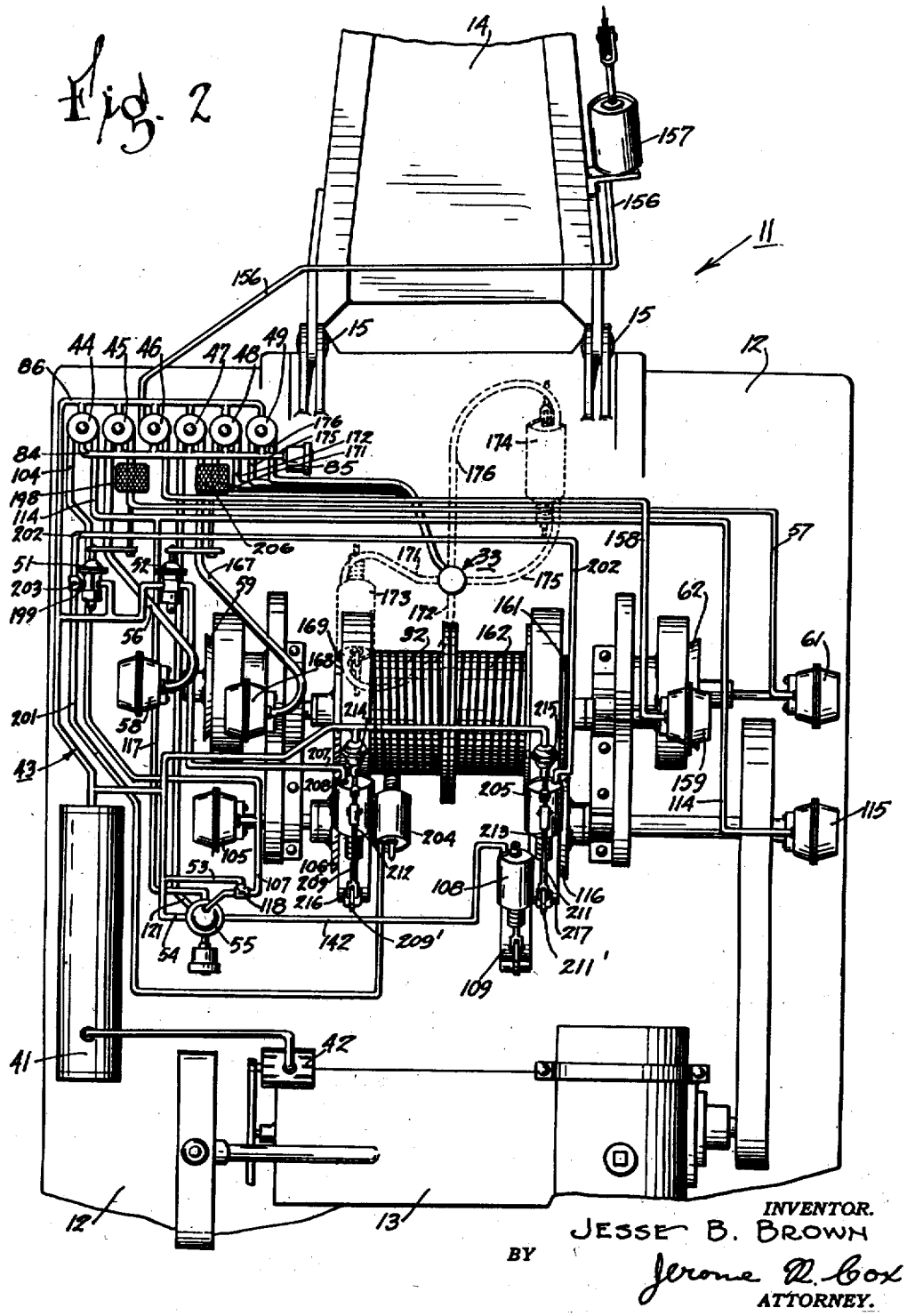

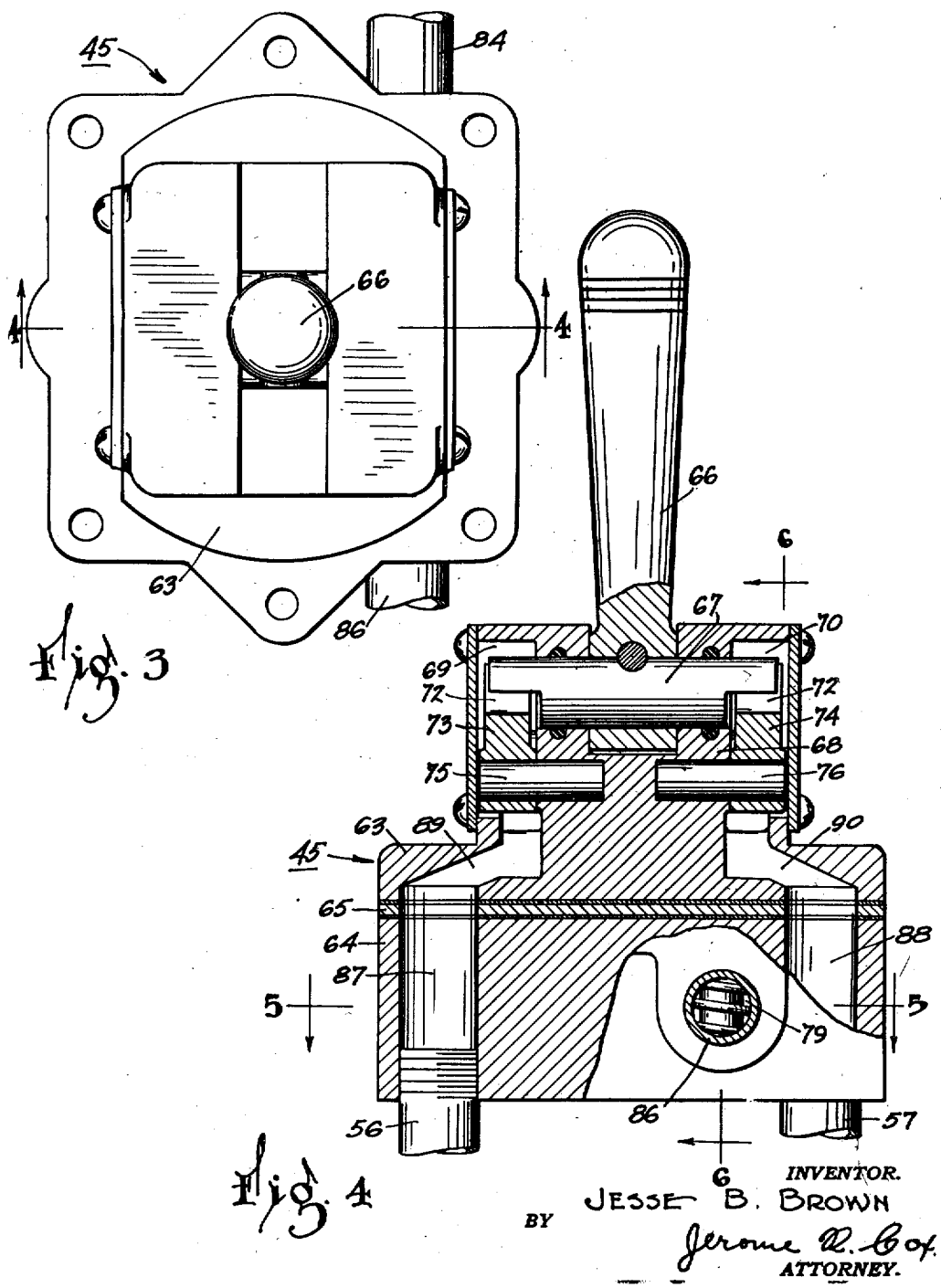

March 27, 1945.  J. B. BROWN  2,372,311
CONTROL MECHANISM
Filed April 17, 1939   12 Sheets-Sheet 4

INVENTOR.
JESSE B. BROWN
BY Jerome R. Cox
ATTORNEY.

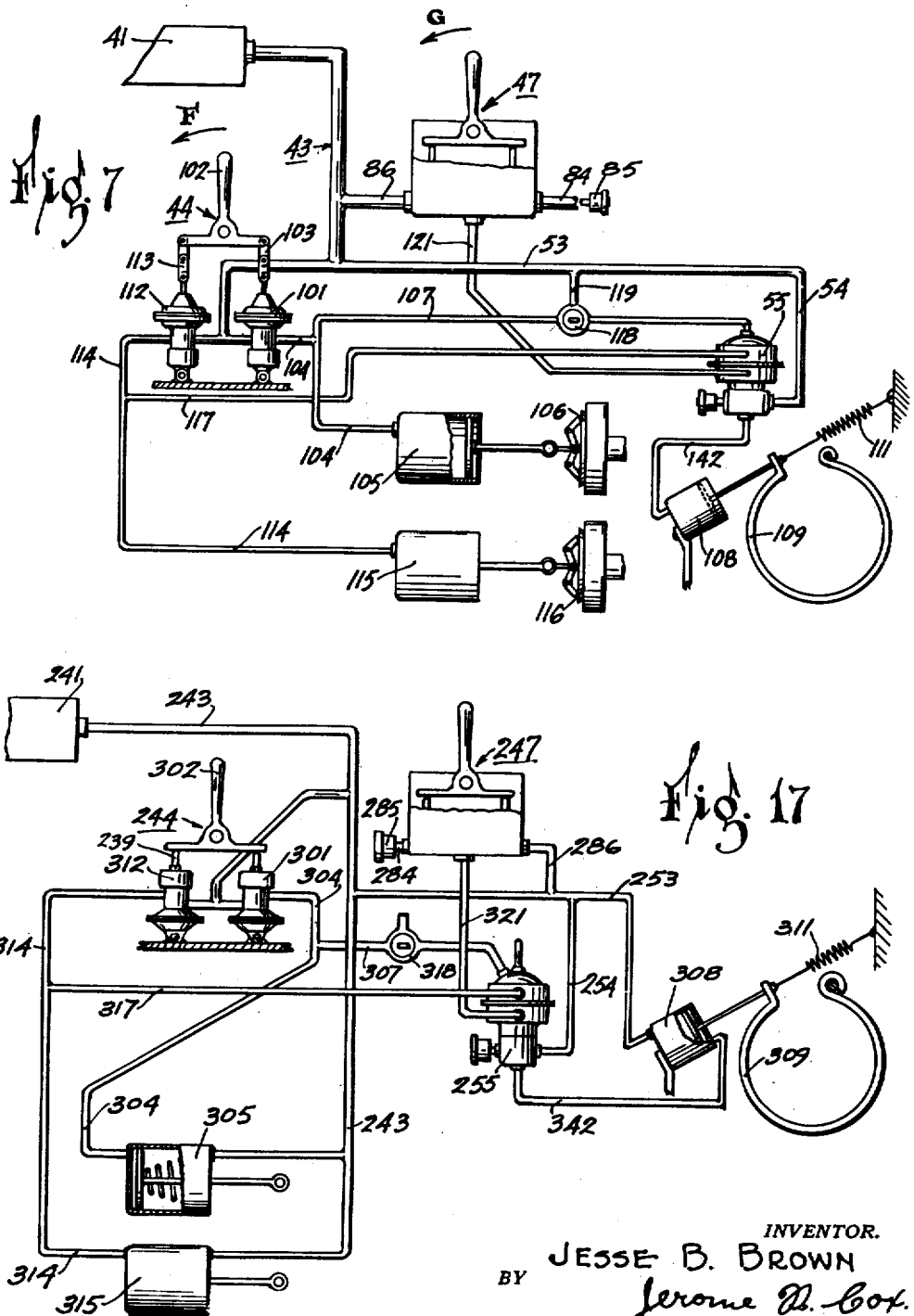

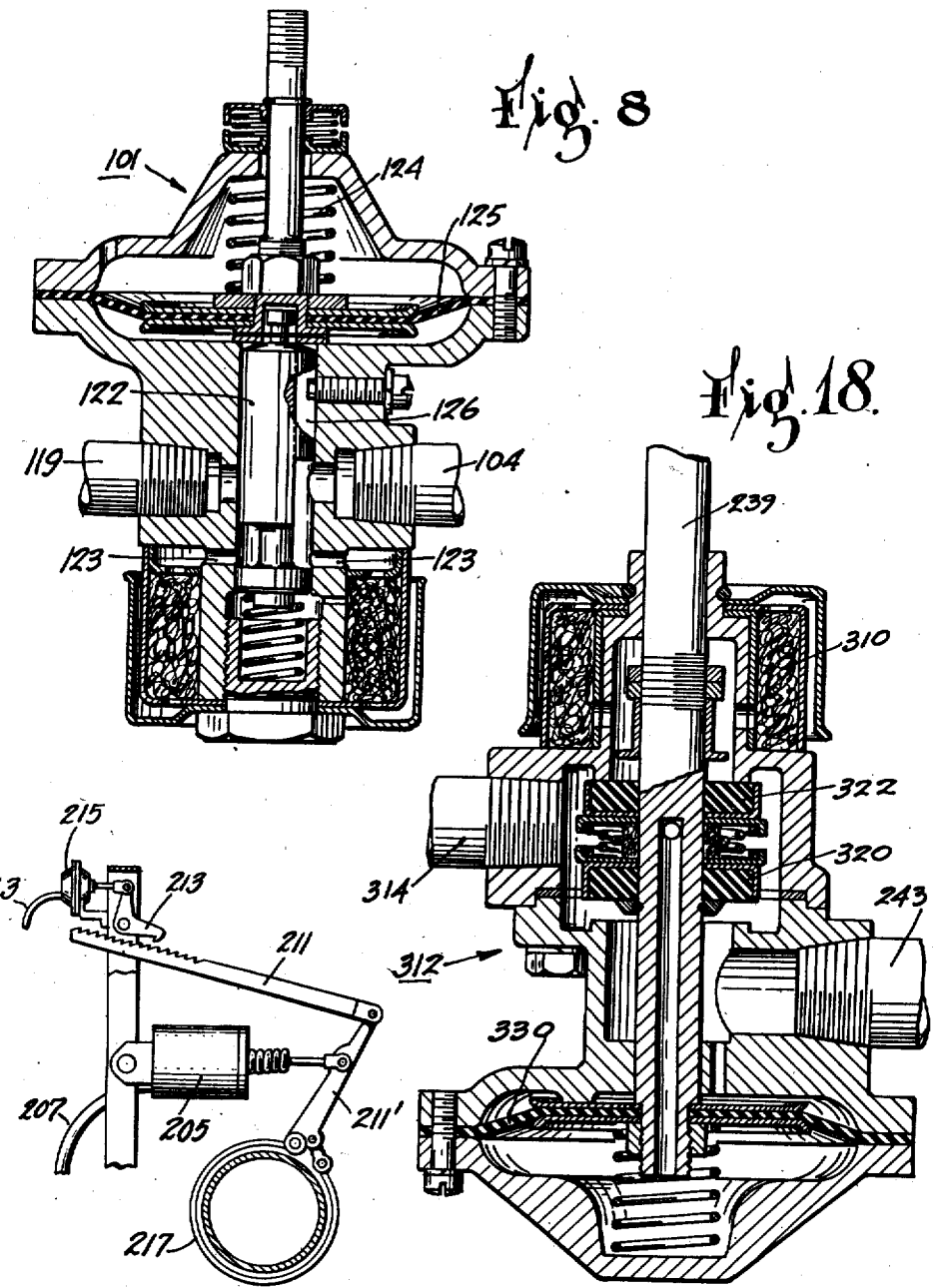

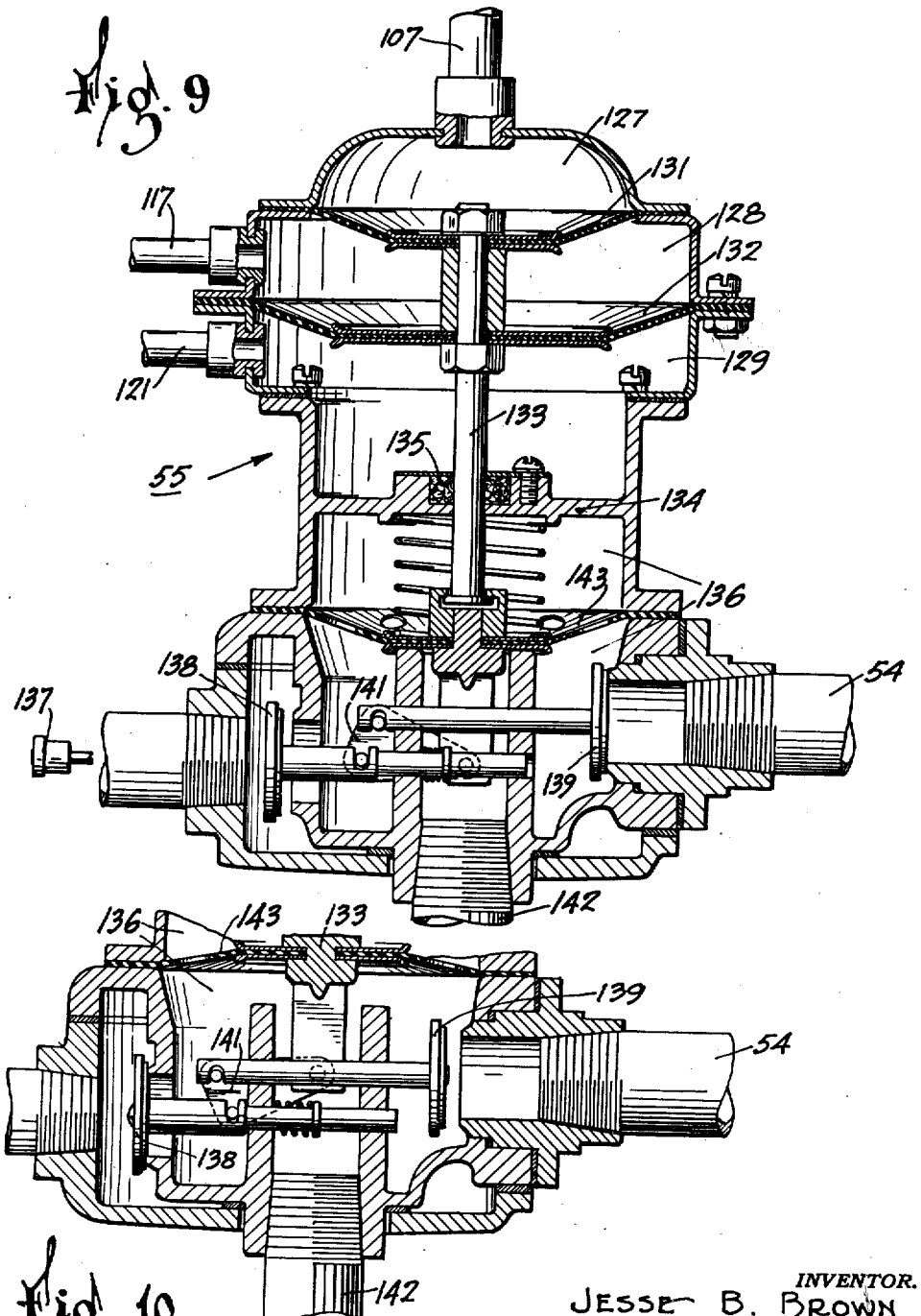

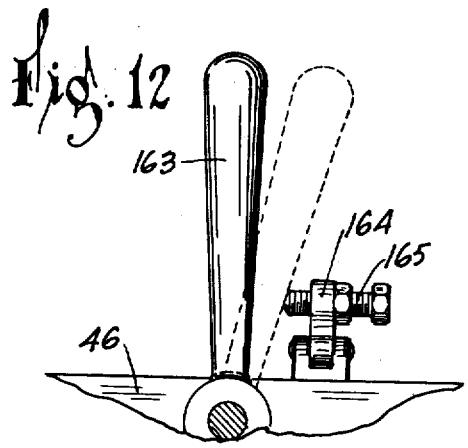
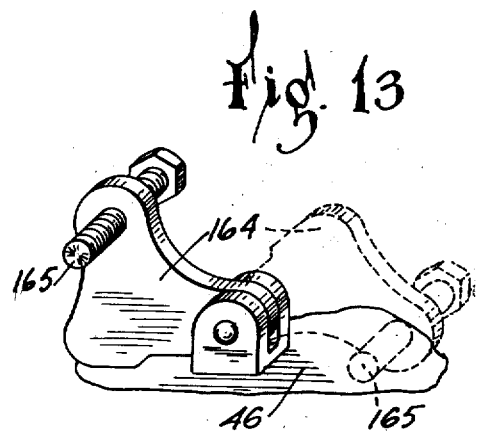
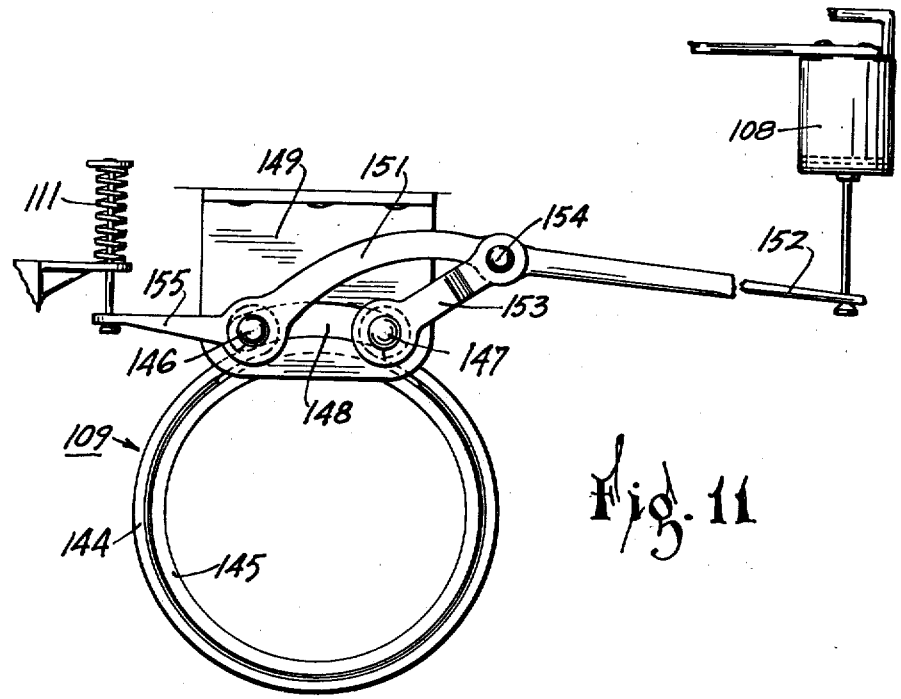

March 27, 1945.    J. B. BROWN    2,372,311
CONTROL MECHANISM
Filed April 17, 1939    12 Sheets—Sheet 9
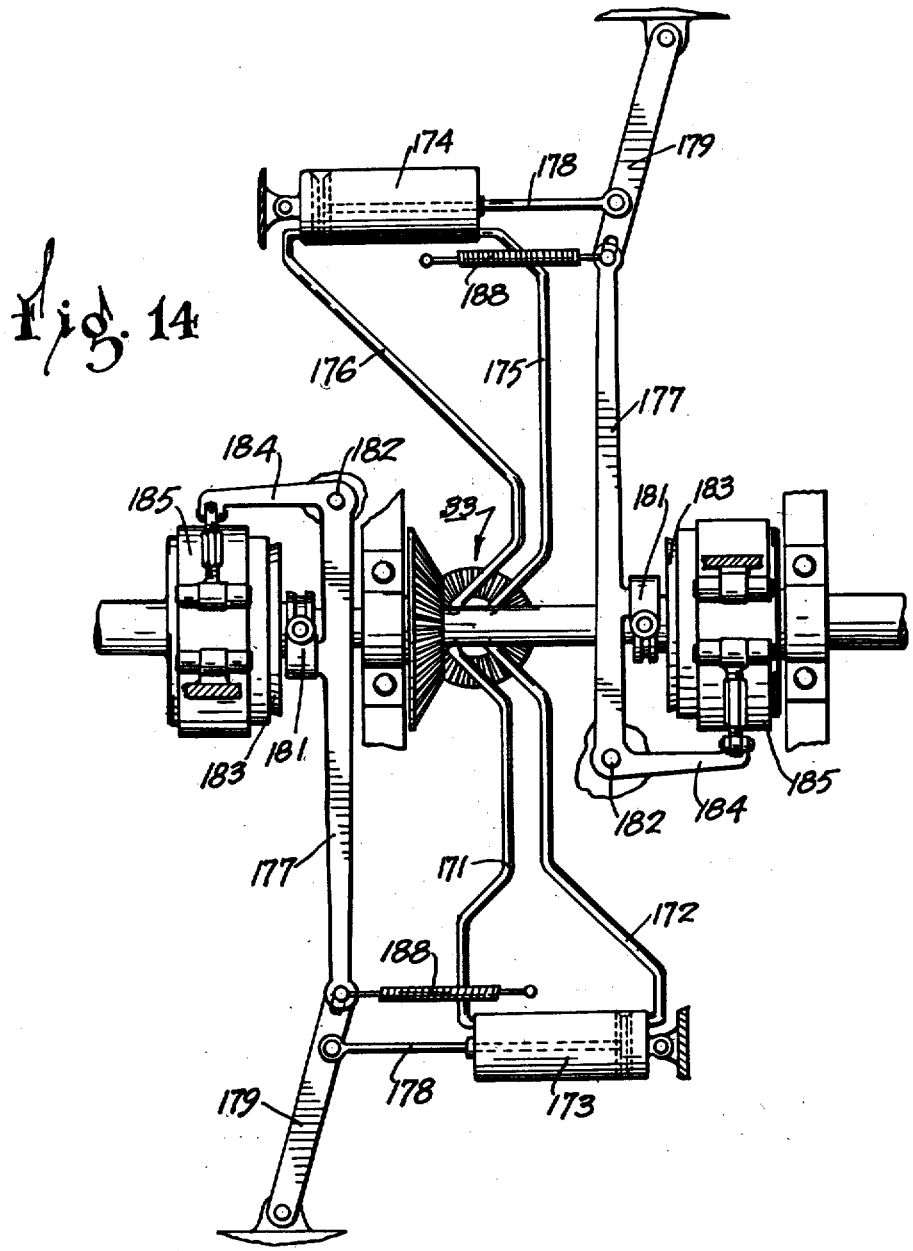
INVENTOR.
JESSE B. BROWN
BY Jerome R. Cox
ATTORNEY.

March 27, 1945.   J. B. BROWN   2,372,311
CONTROL MECHANISM
Filed April 17, 1939   12 Sheets-Sheet 10
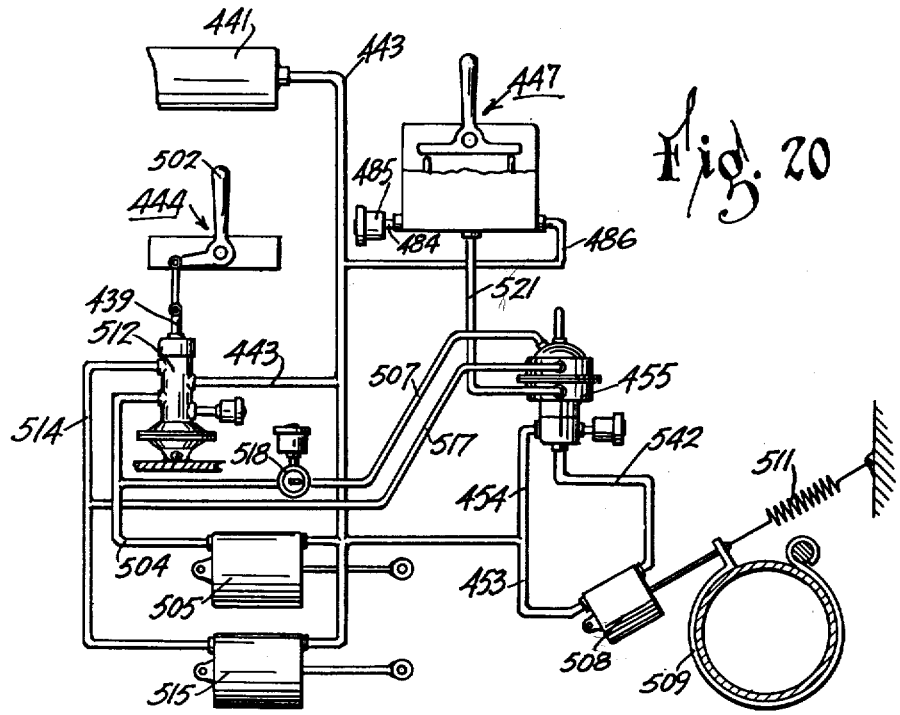
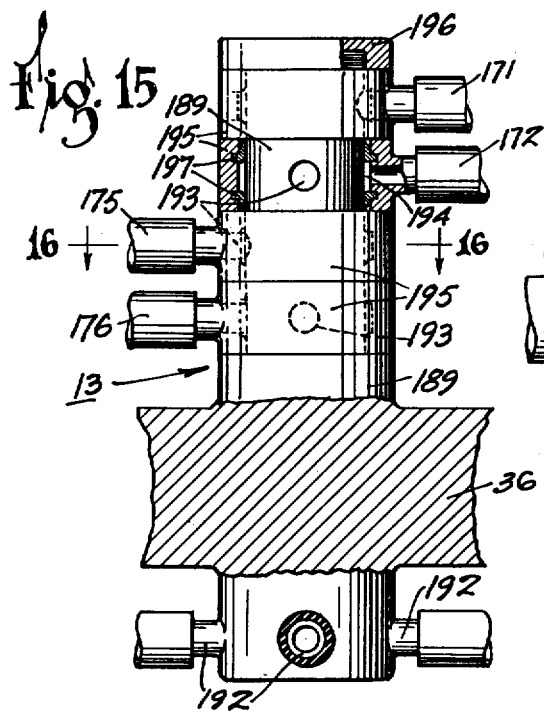
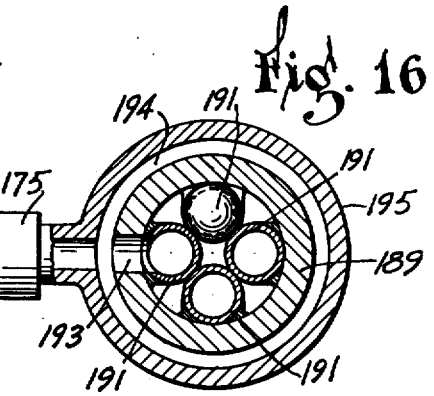
INVENTOR.
JESSE B. BROWN
BY Jerome R. Cox
ATTORNEY.

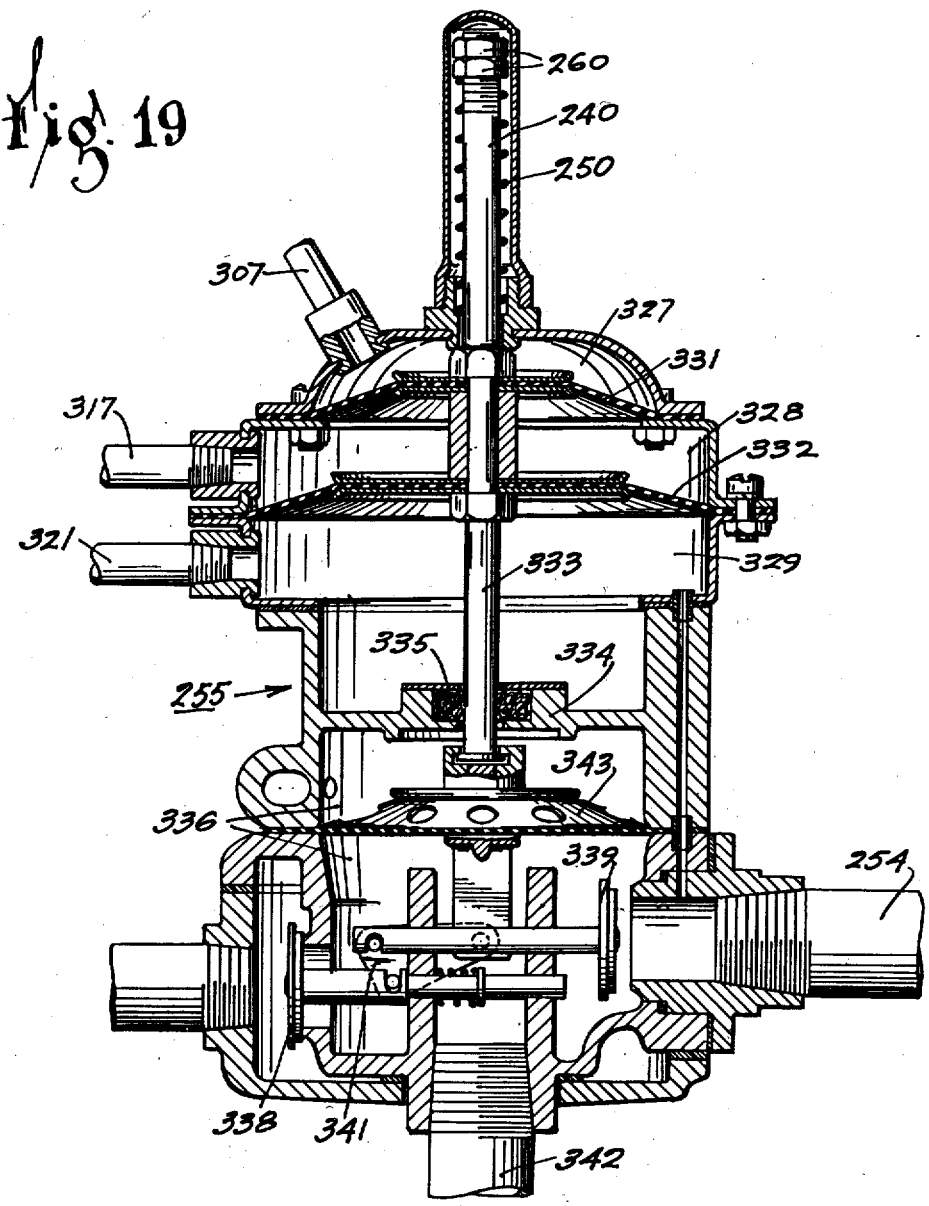

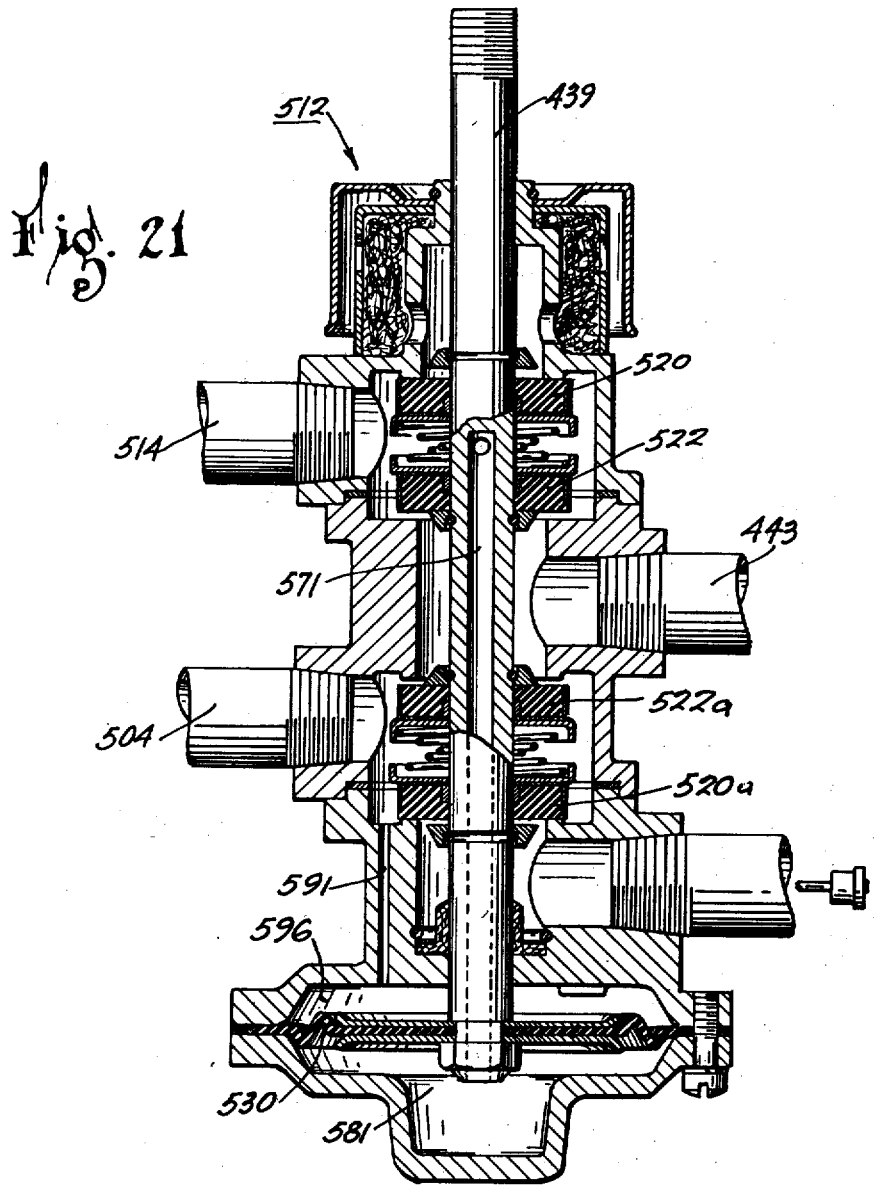

Patented Mar. 27, 1945

2,372,311

UNITED STATES PATENT OFFICE 2,372,311

CONTROL MECHANISM

Jesse B. Brown, South Bend, Ind., assignor to Bendix Aviation Corporation, South Bend, Ind., a corporation of Delaware Application April 17, 1939, Serial No. 268,356

4 Claims. (Cl. 214—135)

This invention relates to mechanism for operating power shovels, cranes, excavators and similar types of labor saving machinery and more particularly to the arrangement of several actuators therefor in relation to one another. It relates to the remote controls for said actuators and to the relation of said controls to each other.

An object of this invention is to provide various operating means and holding means arranged so that a single movement of the remote control therefor releases one of the means and actuates the other.

A further object is the provision of a single control valve capable of actuating a plurality of different operating cylinders either simultaneously if the instrumentalities associated therewith are normally actuated simultaneously or alternatively if the instrumentalities are never operated at the same time.

Still another object of this invention is to provide a remote control for power applying means, together with means to limit the remote control at times to a predetermined application but so arranged that with the shifting of a secondary element the power applying means may be fully applied.

Another object of this invention is to provide control means in the form of a valve controlling two service outlet lines, so arranged that both lines are subject to the operating medium pressure when the valve is in the neutral position and operation of the valve in either direction reverses the pressure in one of the service lines.

A feature of this invention is the provision of a pair of clutch members and a pair of brake members operated by a pair of remote controls; the clutches being paired with the brakes in such a manner that by remote control either clutch may be actuated with the brake of the other pair and also so that both clutch members or both brake members may be operated at the same time.

Other objects and features of the invention will be apparent from a reading of the subjoined specification and claims and from a consideration of the accompanying drawings, in which:

Figure 2 is a diagrammatic view of the power shovel of Figure 1 showing the actuating means for its various operations;

Figure 3 is a plan view of my novel hand control valve;

Figure 4 is a view partly in elevation and partly in section taken substantially on line 4—4 of Figure 3;

Figure 7 is a diagrammatic showing of the "swing" operation control system;

Figure 8 is a view in vertical section of one of the hand operated valves shown in Figure 7;

Figure 9 is a view in vertical section of my novel valve which automatically controls the operation of the "swing" brake, the valve being illustrated as in the normal or brake applied position;

Figure 10 is a fragmentary view in section showing the valve mechanism of Figure 9 in the brake released position;

Figure 11 is a diagrammatic showing in more detail of the "swing" brake also shown in Figure 2;

Figure 12 is a side view in elevation showing the means provided to limit the application of the hand valve to a predetermined degree in order to obtain "slip" in the clutch operated thereby;

Figure 13 is a perspective view of the stop of Figure 12, the stop being shown also in dotted lines in the position to permit unrestricted operation of the valve handle with which it is associated;

Figure 14 is a fragmentary view from beneath the chassis illustrating the clutch and brake arrangement of the "steering" control;

Figure 15 is a fragmentary view partly in elevation and partly in section illustrating the means of carrying the service lines from the rotating platform to the non-rotating chassis through the pivot structure;

Figure 16 is a sectional view taken substantially on the line 16—16 of Figure 15;

Figure 17 is a diagrammatic showing of a modified form of control system similar to that shown in Figure 7;

Figure 18 is a view in vertical section of one of the hand operated valves shown in Figure 17;

Figure 19 is a view in vertical section of a valve of Figure 17 which is like the valve of Figure 9 arranged to control automatically the operation of the swing brake, but modified for use in a vacuum suspended system;

Figure 20 is a diagrammatic showing of a control system similar to Figure 17 incorporating therein another novel hand control valve;

Figure 21 is an elevational view of the novel hand operated valve shown in Figure 20; and Figure 22 is a diagrammatic view of the detent mechanism for holding the brakes applied should the power fail.

Figure 1:
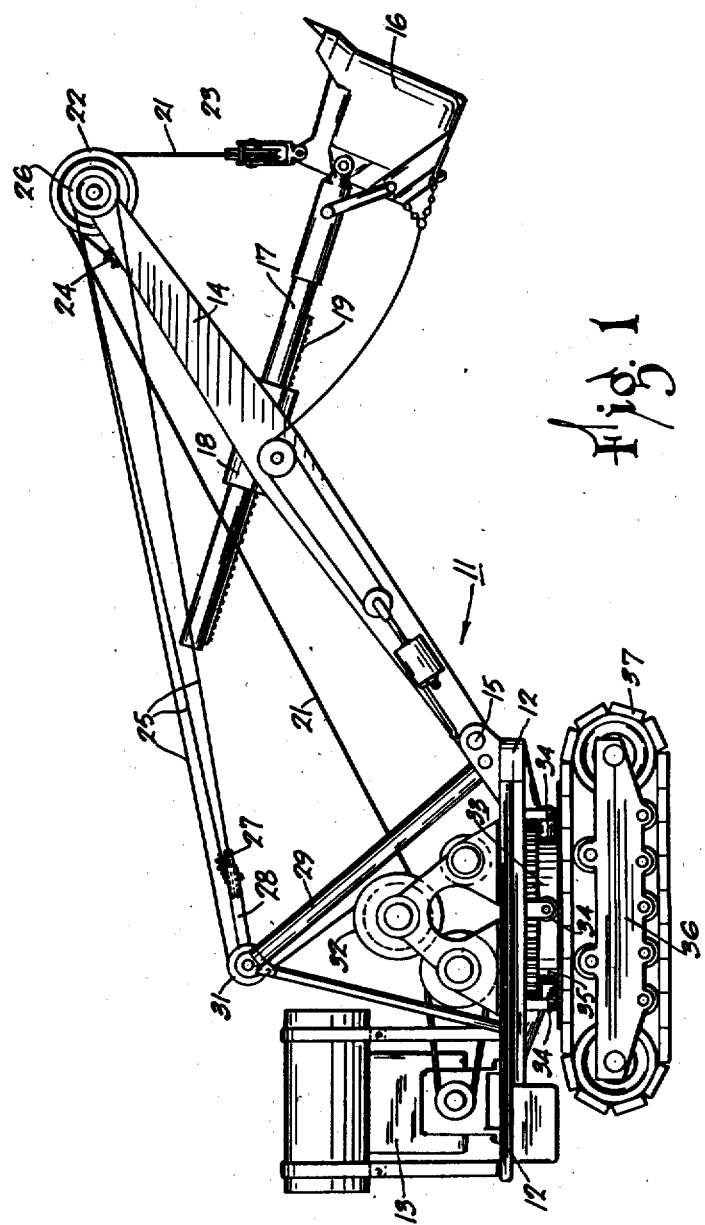
Figure 1 is a side view of a power shovel illustrating the application of my invention.

Referring now in detail to the drawings, it may be seen that I have shown in Figure 1 a power shovel 11 having a rotatable platform 12 upon which is mounted a gasoline engine 13 providing a source of power for the operating mechanism. A boom 14 is mounted on a horizontal pivot 15 on the forward end of the platform 12 and is provided with a dipper or shovel 16 mounted on a slidable member 17. The member 17 is slidably mounted in a journal 18 pivotally mounted on the boom 14 and is also provided with a rack 19 by which the shovel is caused to move outwardly or "crowd" or to return or "rack" by a pinion gear associated with the rack 19 and other gearing not shown. The shovel 16 is raised or lowered, pivoting on its mounting 18 in boom 14, by means of a "drag" line or bucket line 21 suitably guided in a pair of sheaves 22 mounted on the outer end of the boom 14 and a sheave 23 secured to the shovel itself. It will be understood that the bucket line 21 passes around one sheave 22, thence around the sheave 23, thence back around the other sheave 22 and is then secured to the boom 14 at 24. The boom 14 pivoted at its lower end to platform 12 as at 15 has its outer end raised and lowered by means of a "hoist" line 25 suitably guided in a pair of sheaves 26 also mounted upon the outer end of the boom 14 and another pair of sheaves 27 mounted in a swinging bracket 28 of a brace frame 29 and a single sheave 31 mounted at the apex of the frame 29. Thus it will be seen that the "hoist" line 25 (spooled on its drum 32 to raise the boom 14 or off to lower it) passes around the sheave 31, thence around one of the sheaves 26, thence to the pair of sheaves 27, thence to the other sheave 26 and returns to the bracket 28 to be secured thereto.

The platform 12 is mounted on a pivot 33, details of which will be hereinafter described, and is provided with suitable gearing in order that the platform 12 may be caused to rotate or "swing" in either direction upon the pivot 33 under control of an operator. Further, the platform 12 is provided with guide rollers 34 confined in a guide 35 mounted on a chassis 36, the chassis being provided with caterpillar treads or crawlers 37.

The operating mechanism and controlling mechanism are better shown in Figure 2. It will be noted that a vacuum system is provided including a tank 41, wherein a vacuum is maintained by a vacuum pump 42 associated with the engine 13. In communication with the tank or vacuum source 41 by means of conduit generally designated by numeral 43 are control assemblies 44, 45, 46, 47, 48 and 49, each having valves associated with hand controls. Also associated and in communication with the vacuum tank 41 through conduit 43 are foot pedal controlled valves 51 and 52. Also connected by conduit 43 and branch conduits 53 and 54 is an automatic control valve 55. Hand control valves 44, 45, 46, 47, 48, 49 and foot pedal controlled valves 51 and 52 control the operation of the boom 14, rack member 17, shovel 16, rotation of the platform 12 and operation of the caterpillar crawlers 37. Valve 55 is an automatic valve operated by differentials of pressures to operate the brake restricting rotation of platform 12. The manner in which these control units operate the various parts will now be described in detail.

The control valve assembly 45 controls a system comprising clutch operators (power cylinders) and as this system is similar in many respects to those systems controlled by hand control valve assemblies 46, 47, 48 and 49, it may be considered typical thereof. The system may be readily appreciated from Figure 2 while the hand control valve assembly 45 is described in detail with reference to Figures 3, 4, 5 and 6.

The control valve assembly 45 controls the movement in and out of the rack member 17 for "crowd" and "rack" operation of the bucket 16. The control mechanism which controls the "crowd" and "rack" operation may also in the well-known manner control the "travel" operation which is forward and rearward movement of the entire outfit and the operation of the "travel" may be in one or more speeds.

Hand control assembly 45 is connected by conduits 56 and 57 respectively to a power cylinder 59 arranged to actuate a "crowd" clutch 59 and to a power cylinder 61 arranged to actuate a "rack" clutch 62.

Figure 5:
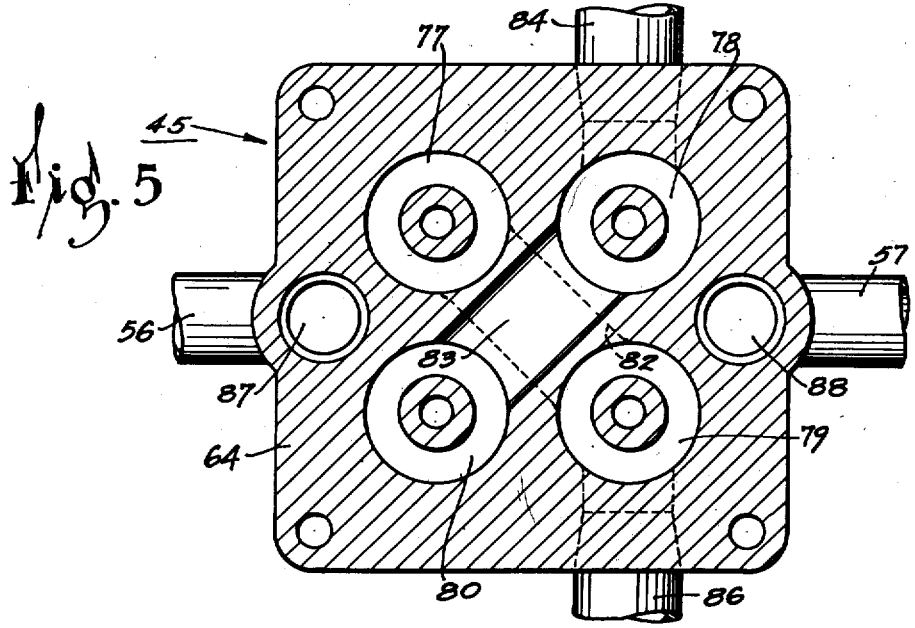
Figure 5 is a sectional view taken substantially on line 5—5 of Figure 4.

Valve 45 is shown in detail in Figures 3, 4, 5 and 6 and comprises (see Figure 6) an upper portion 63 and a lower portion 64 having secured therebetween, suitably gasketed, a plate member 65 providing seats for valve members housed in the lower portion 64. An operating lever 66 is secured to a shaft member 67 journaled in a partition 68 dividing the upper portion 63 of valve 45 into two chambers (see Figure 4) 69 and 70. The shaft member 67 rocked by the lever 66 is flattened at each end to provide line contact with cam surfaces 72 of valve operating rockers 73 and 74 respectively pivoted on pins 75 and 76 secured in partition 68. In Figure 5, it may be noted that the lower portion 64 of the valve 45 is provided with four vertically disposed bores forming valve chambers 77, 78, 79 and 80. Bores 77 and 79 are in open communication by means of a diagonal passage 82 as are the bores 78 and 80 by means of a passage 83. Thus atmospheric pressure is maintained in chambers 78 and 80 by air entering through conduit 84 provided with an air cleaner 85 (Figure 2) and subatmospheric pressure is maintained in chambers 77 and 79 through open communication with vacuum tank 41 by means of conduit 86. Lower portion 64 is also provided with vertically disposed bores 87 and 88 providing through passages 89 and 90 open communication between the chambers 69 and 70 and conduits 56 and 57 respectively. Thus the pressures prevailing in the chamber 69 are reproduced at the "crowd" clutch power cylinder 58 through the passage 89, bore 87 and the conduit 56 and the pressures prevailing in the chamber 70 are reproduced at the "rack" clutch power cylinder 61 through the passage 90, bore 88 and the conduit 57.

Figure 6:
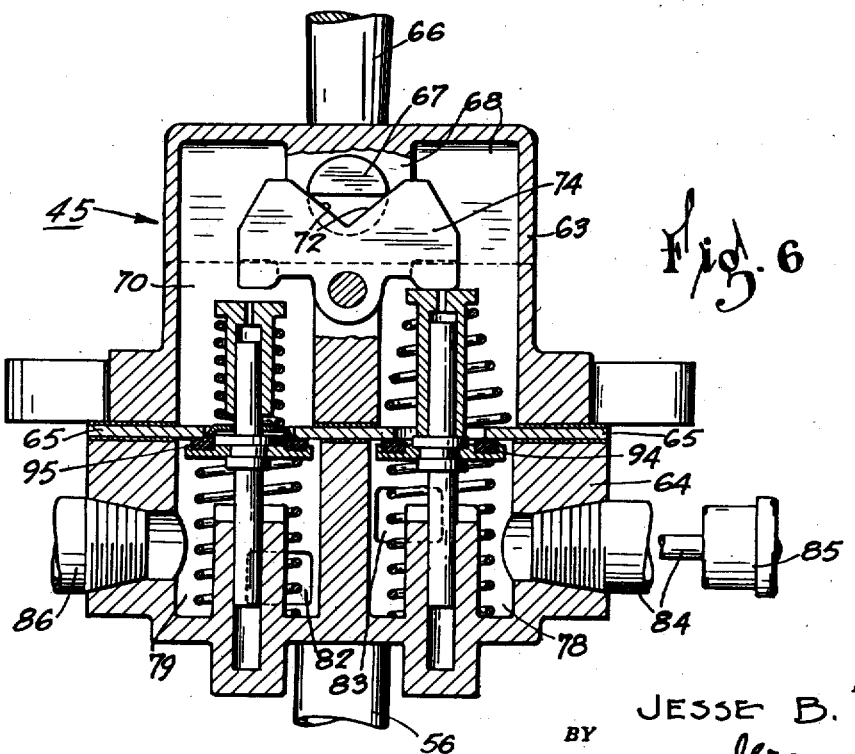
Figure 6 is a sectional view taken substantially on line 6—6 of Figure 4.

Bores 78 and 80 are each provided with a valve member 94 which control the air entrance into the upper chambers 69 and 70. Bores 77 and 79 are each provided with a valve member 95 which control the vacuum entrance to said chambers 69 and 70. Valve members 94 are slightly removed from their seats on member 65 when the valve handle 66 is in the neutral position as shown in Figure 6, thus subjecting the chambers 69 and 70 and the various members controlled by the valve assembly to atmospheric pressure.

From the above, it is readily seen that the control valve assembly controls two operators; namely, that of moving the shovel 16 outwardly and that of returning it. The valve mechanism is such that the actuation of neither of the operations is possible when the control valve assembly handle is upright in the neutral position. Movement of the handle in one direction energizes the mechanism to perform one operation and definitely maintains the other mechanism inactive and movement of the handle in the other direction beyond neutral reverses the procedure, maintains the previously energized mechanism inactive, and energizes the previously inactive mechanism.

The control assembly 44 controls the rotation of the platform 12 and the system operated thereby is separated and shown in Figure 7 for clarity.

Referring to Figure 7, a valve 101 is operated by forward movement of the handle 102 as indicated by the arrow F through linkage 103 which actuates the valve 101 through tension only. It will be noted that this linkage or chain 103 collapses in compression and transmits in compression no movement whatsoever to the valve parts associated therewith. The valve 101 when actuated by forward operation of a handle 102 connects suction from a conduit 43 through a conduit 104 to a power cylinder 105 to operate a clutch 106 to rotate the platform 12 and "swing" its associated boom 14 (not shown in Figure 13) in one direction. Branch conduit 107 connected through conduit 104 with the valve 101 leads to a valve 55 and is arranged to energize the valve to operate a power cylinder 108 to release a "swing" brake 109 normally held applied by spring 111. Likewise, rearward movement of the handle 102 operates a valve 112 through suitable linkage 113 also operable in tension only. A conduit 114 connects valve 112 with a power cylinder 115 which operates a clutch 116 to rotate the platform 12 and "swing" its associated boom 14 in the reverse direction. A branch conduit 117 of the conduit 114 connects the valve 112 with the valve 55 to actuate the valve mechanism therein to also release the brake 109 as before.

It is sometimes desirable to operate the swing brake apart from the "swing" operation described above. This is accomplished through a three-way valve 118 interposed in the conduit 107. This valve 118 is also connected to the source of suction 41 through a branch conduit 119 of the conduit 53. Valve 55 is connected by a conduit 121 with control assembly 47 so arranged that upon movement of the handle of the assembly 47 forward as indicated by the arrow G, it connects the vacuum tank 41 through the conduit 43, the valve assembly 47 and the conduit 121 with one chamber of the valve 55. Assuming that valve 118 is set to leave the conduit 107 open, this has no effect upon the operation of valve 55 but if the valve 118 is turned to connect suction line 119 to the upper chamber of valve 55, operation of the assembly 47 is effective to allow the application of the brake 109 as will be later more fully described.

Figure 8 illustrates in greater detail the valve 101. As the valve 112 is a duplicate of the valve 101, a description of the valve 101 will suffice for both. The valve 101 is provided with a spool type valve member 122 which brings into open communication the conduit 104 and atmospheric entrance ports 123 when in its lowermost position as shown (with the operating handle in the upright or neutral position). Movement of the hand lever 102 forward raises the valve member 122 to close off the air inlet ports 123 and open communication between the conduits 104 and 119. The establishment of open communication between the conduits 104 and 119 subjects the power cylinder 105 and the upper chamber of the valve 55 to the subatmospheric pressure of tank 41. A compression spring 124 and suction on the underside of diaphragm 125 when in the raised position tend to return the valve member 122 to the normal position first described. The underface of the diaphragm 125 is subjected at all times to the pressure in the cylinder 105 inasmuch as the conduit 104 is connected by a passage in the form of a slot 126 with the space below the diaphragm 125. The space above the diaphragm 125 is connected to the atmosphere and therefore the diaphragm is urged downward at all times by a force comprising the effort of spring 124 and the differential in pressures acting on its faces equivalent to the differentials in pressures in the cylinder 105. The valve member 122 is moved from the position shown upward, by tension on the linkage 103 when the handle 102 is moved forward. Thus the force exerted by the cylinder 105 is accurately controlled. The cylinder 105, it will be noted has two chambers, one on each side of the piston in the cylinder. The chamber to the right of the piston is at all times open to atmosphere. The chamber to the left of the piston, since it is connected to conduit 104, has the same pressure as conduit 104, and this pressure is determined by the position of valve member 122, i. e., by the movements of valve member 122 opening or closing the ports 119 and 123. Since passage 126 connects conduit 104 to the chamber in valve 101 which is just below diaphragm 125, the pressure conditions under diaphragm 125 are the same as those on the left side of the piston in cylinder 105. The chamber above diaphragm 125 is open to atmosphere, and, therefore, the same pressure differential prevails over diaphragm 125 as prevails over the piston in cylinder 105. Since the pressure differential over diaphragm 125 tends to move valve member 122 downward and thereby close port 119 and open port 123 to release the clutch, the operator will feel this pressure reacting against his manipulation of valve 101, the reaction being proportional to the force exerted by cylinder 105.

The automatic control valve 55 (Figure 9) is provided with an upper portion comprising three chambers 127, 128 and 129 opening into which are conduits 107, 117 and 121 respectively. Separating the chambers 127 and 128 is a diaphragm 131 and separating chambers 128 and 129 is a diaphragm 132 of substantially twice the effective area of diaphragm 131. A valve operating rod 133 having the diaphragms 131 and 132 secured to its upper end is slidably mounted in a partition 134 forming the lower wall of chamber 129. Suitable packing 135 is provided to prevent leakage at this point. A chamber 136 in the lower portion of valve 55 has communication to the atmosphere through an air cleaner 137 and vacuum conduit 54 controlled by valves 138 and 139 respectively actuated by a rocker link 141 secured to the lower end of valve rod 133. The chamber 136 is also in open communication with power cylinder 108 through conduit 142. Thus it will be seen that with the valve rod 132 down as shown in Figure 9, the valve 138 leading to atmosphere is open and the valve 139 leading to suction is closed, thus providing no differential pressure to the power cylinder 108 and allowing the application of the "swing" brake through tension spring 111. As shown in Figure 10 with the valve rod 132 up, the valve 138 leading to atmosphere is closed and the valve 139 controlling the suction is open, placing the chamber 136, conduit 142 and power cylinder 108 under subatmospheric pressure to pull the brake 109 to a released position against the tension of spring 111. It is to be understood that when the valve members 138 and 139 are moved from the position shown in Figure 9 to the position shown in Figure 10, there is an intermediate lapped position inasmuch as the valve 138 is seated firmly before the valve 139 is raised from its seat. It is also to be noted that a diaphragm 143 secured near the lower end of the rod 133 is perforated so that the portion of the chamber 136 above the diaphragm 143 is in communication with the lower portion at all times. In this connection, it will be seen that the diaphragm 143 serves only to maintain the lower portion of valve rod 133 centrally located.

The "swing" brake may be arranged as shown in Figure 11 and is generally designated by the numeral 109. The brake 109 comprises a band 144 which embraces a member 145 forming a part of the platform 12 which it is desired to hold against rotation. The band member 144 has its ends 146 and 147 slidably mounted to anchor in the ends of a slot 148 of a fixed member 149. On the end 146 of the band 144, there is mounted a bellcrank lever 151 which has on one of its arms 152 a link 153 fulcrumed as at 154. The link 153 is rotatably secured at its other end to the anchor end 147 of the brake band 144. An arm 155 of the bellcrank lever 151 is constantly urged in a clockwise direction as seen in Figure 11 by a spring 111 suitably secured to the free end thereof. It will be noted that the arm 152 of the bellcrank lever 151 forms a toggle with link 153, and thus movement of the arm 152 in a counter-clockwise direction under the influence of the power cylinder 108 tends to release the brake 109 and clockwise movement of the arm 152 influenced by the spring 111 through arm 155 tends to apply the brake 109. It will be understood that the spring 111 keeps the brake 109 applied at all times except when held released by the energizing of the power cylinder 108.

The valve assembly 47 is exactly the same as valve assembly 45 disclosed in detail in Figures 3, 4, 5 and 6. The bore 87 is connected to conduit 121 however. The bore 88 operates the "hoist" clutch and will be later described.

The operation of the system shown in Figure 7 is as follows: Forward movement, as indicated by the arrow F, of the handle 102 through links 103 closes the atmospheric entrance 123 of the valve 101 and opens communication between the vacuum tank 41 and the clutch power cylinder 105 through conduits 104 and 119 to apply the left hand "swing" clutch. Communication is also established through branch conduit 107 and three-way valve 118 with the upper chamber 127 of valve 55. Inasmuch as at this time chamber 128 is connected through conduit 117 and valve 112 with atmosphere and chamber 129 is also connected with the atmosphere through conduit 121 and valve 47, this connection of chamber 127 with suction through conduit 107 and the valve 101 causes upward movement of the diaphragms 131 and 132 and the rod 133. This actuates valve 55 to open communication between vacuum tank 41 and power cylinder 108 to release the brake 109 otherwise held applied by tension of the spring 111. Movement of the handle 102 to the rear of the neutral position actuates the valve 112 to open vacuum communication to the power cylinder 115 through conduit 114 to apply the right hand "swing" clutch and also through the conduit 117 to the intermediate chamber 128 of the valve 55. This connects the chamber 128 with suction and inasmuch as the chambers 127 and 129 are connected through their respective valves 101 and 47 with atmosphere and inasmuch as the area of the diaphragm 132 is double the area of the diaphragm 131 the diaphragm and the valve rod 133 are raised. This actuates the valve members 138 and 139 and releases the brake 109 in the manner described above.

It is sometimes found desirable to operate the "swing" brake 109 wholly independent of the control through handle 102. When this is desired the manually operated three-way valve 118 is set in its other position to close off communication to conduit 107 and open communication between the vacuum tank 41 and the upper chamber 127 of valve 55 to actuate the valve rod 133 upwardly and in turn actuate the valve mechanism to energize the power cylinder 108 to maintain brake 109 in the released position. Now, with forward movement of the control handle of valve 47, previously described, vacuum or subatmospheric pressure is admitted to the lower chamber 129 of valve 55 through conduit 121 to actuate the valve rod 133 downwardly and admit air to the power cylinder 108, thus permitting spring 111 to apply the "swing" brake. Return of the handle of valve 47 to the neutral position admits atmospheric pressure to the lower chamber 129 of valve 55, thus making the vacuum in the upper chamber 127 effective again to actuate the valve rod 133 upwardly and admit subatmospheric pressure to power cylinder 108 to release the brake 109.

Referring now again to Figure 2, hand control valve assembly 46 is exactly like the control valve assembly 45 described above. The lower end of bore 87 (Figure 4) of the valve assembly 46 is however connected to a conduit 156 (Figure 2) leading to a power cylinder 157 associated to actuate a dipper trip latch on the dipper or shovel 16. The lower end of bore 88 of the valve assembly 46 is however connected to a conduit 158 leading to a power cylinder 159 arranged to actuate a clutch 161 associated with a "drag line" drum 162.

Moreover, there is provided an adjustable stop for the valve assembly handle. As may be seen in Figures 12 and 13, the valve assembly handle 163 has cooperating therewith a pivotally mounted member 164 provided with an adjustment screw 165. The screw 165 is arranged to limit the movement of the handle 163 when the member 164 is in the position shown in full lines. When the handle 163 is so limited the rate of evacuation of the power cylinder 159 is metered in order to "slip" the clutch associated therewith. The member 164 may be moved out of the path of movement of the handle 163 to the position shown in dotted lines in Figure 13 so as not to limit the movement of handle 163 and the valve 46 may then be operated in the usual manner.

The hand control valve assembly 47 is provided as described above so that the brake 109 may be controlled separately from the clutches 106 and 116 when desired. The hand control valve assembly 47 is connected by a conduit 86 to the vacuum tank 41 by means of the conduit 43 and to the air cleaner 85. Also associated with the hand control valve assembly 47 as by a conduit 167 connected to the bore 88 is a power cylinder or air motor 168 arranged to actuate a clutch 169 on a "hoist" drum 32 in axial alignment with the "drag line" drum 162. Thus it will be seen that the two functions of control valve assembly 47 are to separately operate the "swing" brake and control the clutch to raise the boom 14. Lowering of the boom 14 is accomplished in the usual manner by releasing the clutch and allowing the weight of the boom to pull the hoist line off of its drum until it is checked by its associated brake or reengagement of the clutch.

Hand control valve 48 and 49 control the "steering" of the power shovel 11 and as the function and systems are similar they may be considered together. The steering is accomplished through movement of the caterpillars or crawlers 37. The control valve assembly 48 actuates the mechanism for movement and restriction of movement of the crawler on one side of the power shovel and likewise the control valve assembly 49 actuates the mechanism of the crawler on the other side. It will also be noted that the conduits from the control valve assemblies 48 and 49 mounted for the operator on the rotatable platform 12 must pass through the pivot 33 to the non-rotating chassis 36 which supports the steering mechanism actuators controlled thereby. The hand control valve assembly 48 similar in structure and operation to the valve 45 is connected by conduits 171 and 172 passing through the pivot 23 of platform 12 to opposite ends of a double acting power cylinder 173 and similarly valve 49 is connected to a power cylinder 174 by conduits 175 and 176.

The steering arrangement is better shown in Figure 14 and comprises as before mentioned, two similar systems each applied to a side of the crawler mechanism. Double acting power cylinder 173 and cylinder 174 are each actuated by suction to move an associated bellcrank lever 177 through piston rods 178 and links 179 secured at one end to a fixed part of the crawler chassis. The levers are provided with thrust members 181 adjacent their pivotal points 182 to actuate clutches 183. Arms 184 of levers 177 beyond the pivots 182 are provided with adjustable links secured at their outer ends to brake bands 185. In this arrangement it can be seen that suction applied through conduit 175 and air through conduit 176 will move the piston in the cylinder 174 to the right against the tension of spring 188 to apply the right-hand clutch 183 and release the right-hand brake 185. Conversely with suction applied through conduit 176 and air supplied through conduit 175 the piston will be urged to the left to disengage the right-hand clutch and apply the right-hand brakes. The left-hand clutch and brake are similarly controlled by valve 49. Thus through the hand valves 48 and 49 either crawler may be actuated or either one held against movement to serve as a pivot in steering or both may be urged into motion at the same time or held against movement as during a strictly dipper operation.

It is to be understood that the mechanism used to induce movement to the crawlers 37 may be in the well-known manner reversed to impart rearward as well as forward movement thereto. The springs 188 constantly urge the brakes 185 into holding position to prevent loss of control in event the suction fails.

With reference to Figures 15 and 16, it will be seen that communication between the fixed chassis 36 and the rotatable platform 12 is provided through a tubular member 189 secured to chassis 36. Within the member 189 there are secured against displacement several tubes 191, one being provided for each line for which communication is to be established. The lower ends of tubes 191 are secured to outlets 192 and the upper ends terminate at outlets 193 positioned at different levels with respect to each other and to align with annular channels 194 provided by collars 195 associated with conduits 171, 172, 175 and 176. Collars 195 embracing tubular member 189 are permitted to rotate thereon and held against axial displacement by cap or nut 196. Suitable packing rings 197 prevent suction loss at the localities of relative movement.

Means are provided to operate the "crowd" and "rack" brake and the "drag line" brake. Inasmuch as these are not operated together, I provide a single brake pedal and brake valve associated therewith to control both of these operations. Thus I obtain simplicity and still provide a brake where needed for each of the operations. This is done through the addition of a three-way valve interposed in the conduit between the foot pedal actuated valve and the two separate braking systems. Selection of the system to be braked is accomplished through the manual setting of the three-way valve by the operation prior to beginning operations. In this manner the "crowd" and "rack" operation is braked in one position of the three-way valve and the "drag line" drum is braked in the other position thereof. It is to be understood that the two operations braked in this manner under a single foot pedal do not at any time require braking simultaneously.

A foot pedal 198 (Figure 2) is connected by suitable linkage to actuate a valve 51 similar in structure and operation to the valve 101 illustrated in Figure 8. Adjacent the valve 51 and interposed in the outlet conduit 199 to control communication of the valve 51 to conduits 201 and 202 is a three-way valve 203. With the three-way valve 203 in one position, the valve 51 is in communication through the conduit 201 with a power cylinder 204 arranged to actuate a "crowd" brake (not shown). With the three-way valve 203 turned to its other position, the valve 51 is connected through conduit 202 with a power cylinder 205 arranged to actuate a brake 217 controlling the "drag line" drum 162.

Inasmuch as the hoisting and lowering of the boom 14 is necessary in almost all of the operations of the power shovel, it is provided with a separate brake system under the control of a foot pedal 206. Foot pedal 206 is arranged through suitable linkage to actuate a valve 52 also similar in structure and operation to the valve 101. The valve 52 is connected by a conduit 207 with a power cylinder 208 arranged to actuate a brake 216 controlling the "hoist" drum 32.

It will be readily seen that should vacuum fail for any reason during a braking operation of the hoist or drag line mechanism serious damage or injury might result. As a safeguard I equip the brake applying mechanism associated with these two brakes for this emergency. Bars 209 and 211, as will be more clearly seen in Figure 22, are each formed with ratchets at one end and are secured at their other ends to the brake applying levers 209' and 211'. The ratchet teeth are formed for engagement with detents 212 and 213. The detents are normally held out of engagement by suction acting on diaphragm power cylinders 214 and 215. Should a line fail or suction loss occur for any reason, the loss of suction permits a spring acting on the power cylinder diaphragms to move the diaphragms in a direction opposite to that in which they are urged by the suction. Thus it will be seen that the detent will be immediately brought into engagement with the ratchet teeth provided on the rods 209 and 211. In this manner the brake will be held applied to the degree in effect at the time the suction loss occurred. The power cylinder 214 actuates the safeguard mechanism of the hoist drum brake 216 and similarly power cylinder 215 actuates the safeguard mechanism of the drag line brake 217.

In Figure 17, I have shown diagrammatically a modified system for operating the swing clutches and brake using vacuum suspended cylinders instead of air suspended cylinders. The system shown is substantially the same as that shown in Figure 7 and like elements have been designated by the same numerals with the addition of 200. However, the cylinders 305 and 315 have one end thereof connected through the conduit 243 with the vacuum tank so as to maintain a continuous substantially uniform subatmospheric pressure in these portions of the cylinders. The opposite ends of the cylinders 305 and 315 are connected respectively through conduits 314 and 304 to valves 312 and 301. The connections from the valve 247 to vacuum and to the atmosphere are reversed and the power cylinder 308 has one end connected to the valve 255 through conduit 342 and has its opposite end connected to the vacuum conduit 253. The valve 312 is shown in detail in Figure 18 and includes movable poppet valve members 320 and 322 arranged to connect the conduit 314 either with the atmosphere through an air cleaner 310 or with vacuum through conduit 243. The valve is normally held in a position in which the vacuum conduit 243 is connected to the control conduit 314 by reason of the fact that the valve element 320 is held off of its seat by differentials in pressure acting on opposite sides of the diaphragm 330 and the valve element 322 is at the same time maintained on its seat. However, movement of the handle 302 is effective to move the rod 239 downward reversing the poppet valve and opening communication between the atmosphere through the air cleaner 310 and the control conduit 314 leading to the power cylinder.

The valve 255 is shown more clearly in Figure 19. It corresponds substantially to the valve shown in Figure 9 and like parts are designated by the same numerals with the addition of 200. However, the valve rod 333 is normally raised and has connected to the upper end thereof an extension 240 provided with an associated spring 250 tending to keep the valve raised. The tension on the spring may be varied by adjustment of the nuts 260.

In Figure 20, I have shown another arrangement for operating the swing clutches and brakes similar to the arrangement shown in Figure 17 and like parts therein have been designated by the same numerals with the addition of 200. However, the valve 512 is used instead of two valves and is so arranged that when in the neutral position both of the clutch cylinders 505 and 515 are connected through the valve 512 to vacuum. When the handle 502 is moved in one direction, it connects atmosphere to the clutch cylinder 505 and when it is moved in the opposite direction, it connects atmosphere to the other cylinder 515. In connecting the respective clutch cylinders to atmosphere, it will be seen that movement of the valve rod 439 when opening the atmospheric poppet valve 520 closes the vacuum poppet valve 522, raises the vacuum poppet valve 522ª further from its seat and presses the atmospheric poppet valve 520ª more firmly on its seat. The diaphragm 530 provides a reaction inasmuch as the cylinder 515 is connected through the conduit 514 and the bore 571 to the reaction chamber 581, and the cylinder 505 is connected through the conduit 504 and bore 591 with the reaction chamber 596. The manner in which reaction is secured is as follows: In released position the pistons of cylinders 505 and 515 are submerged in vacuum. When either of the cylinders is to be actuated, atmosphere will be admitted by means of valve 512 to the left side of the piston in the particular cylinder desired to be operated. If cylinder 505 is to be actuated valve stem 439 is moved to open conduit 504 to atmosphere. Conduit 514, leading to cylinder 515, remains in vacuum. Since conduit 514 is connected by bore 571 with chamber 581, that chamber will contain vacuum. Chamber 596, being connected to conduit 504, will have atmosphere admitted thereto at the same rate as atmosphere is admitted to cylinder 505. The result will be to create a pressure differential over diaphragm 530 tending to move the valve member 439 downward. As this happens, valve element 522a opens to admit vacuum to conduit 504, tending to return the piston cylinder 505 to released position. This releasing pressure constitutes the reaction against operator's manipulation of valve 512.

The same principles apply when cylinder 515 is actuated. In this case conduit 514 and chamber 581 are open to atmosphere, conduit 504 and chamber 596 being open to vacuum. The pressure differential over diaphragm 530 now tends to move valve member 439 upward to move valve element 522 and open conduit 514 to clutch releasing vacuum.

It is to be understood that the above described embodiment of my invention are for the purpose of illustration only and various changes may be made therein without departing from the spirit and scope of the invention.

I claim:

1. In power shovel apparatus a dipper, means for raising said dipper, a hoist clutch for actuating said means, a power cylinder for actuating said clutch, a platform, means for swinging said platform, a swing brake for preventing said platform from rotating, a power cylinder for operating said brake, and a valve assembly having a handle arranged in one position to operate said hoist clutch and arranged in another position to alternatively operate said swing brake.

2. A power apparatus for controlling the operation of a rotatable platform member said apparatus including a clutch for actuating said member for rotation in one direction, a clutch for actuating said member for rotation in the opposite direction, a brake for holding said member stationary, a power cylinder for engaging one of said clutches, a power cylinder for engaging the other said clutch, a spring for applying said brake, a power cylinder for releasing said brake, and valve mechanism for controlling the operation of said power cylinders including a relay unit consisting of a three-way valve and power means for operating said relay valve, a manually operated master control valve for controlling the operation of the power means of said relay valve and other manually operated valve means for controlling the operation of the brake operating cylinder independently of the operation of said master control valve.

3. A power apparatus for controlling the operation of a rotatable platform member said apparatus including a clutch for actuating said member for rotation in one direction, a clutch for actuating said member for rotation in the opposite direction, a brake for holding said member stationary, a power cylinder for engaging one of said clutches, a power cylinder for engaging the other said clutch, a spring for applying said brake, a power cylinder for releasing said brake, and valve mechanism for controlling the operation of said power cylinders including a relay unit consisting of a three-way valve and spring and pressure differential operated power means for operating said three-way valve, a manually operated master control valve for controlling the operation of the power means of said relay valve and other manually operated valve means for controlling the operation of the brake operating cylinder independently of the operation of said cylinder by the master control valve said other manually operated valve means including two separate control valves operable to effect a pressure differential operation of the aforementioned power means to effect a release of the brake and also operable to effect a spring operation of said power means to make possible an application of the brake.

4. A power apparatus for controlling the operation of two clutches and a brake of the power plant of a power shovel said apparatus including a single acting pressure differential operated motor for operating one of said clutches, a single acting pressure differential operated motor for operating the other of said clutches, a single acting pressure differential operated motor for operating said brake and valve means for controlling the operation of said motors including a relay valve, a manually operable selector valve for controlling the operation of said relay valve to effect an operation of all three of the aforementioned motors, and two separate manually operated valves for independently controlling the operation of said brake operating motor.

JESSE B. BROWN.